May 26, 1925.
T. H. ALSTON
SCENTLESS ANIMAL TRAP
Filed March 26, 1923
1,539,103
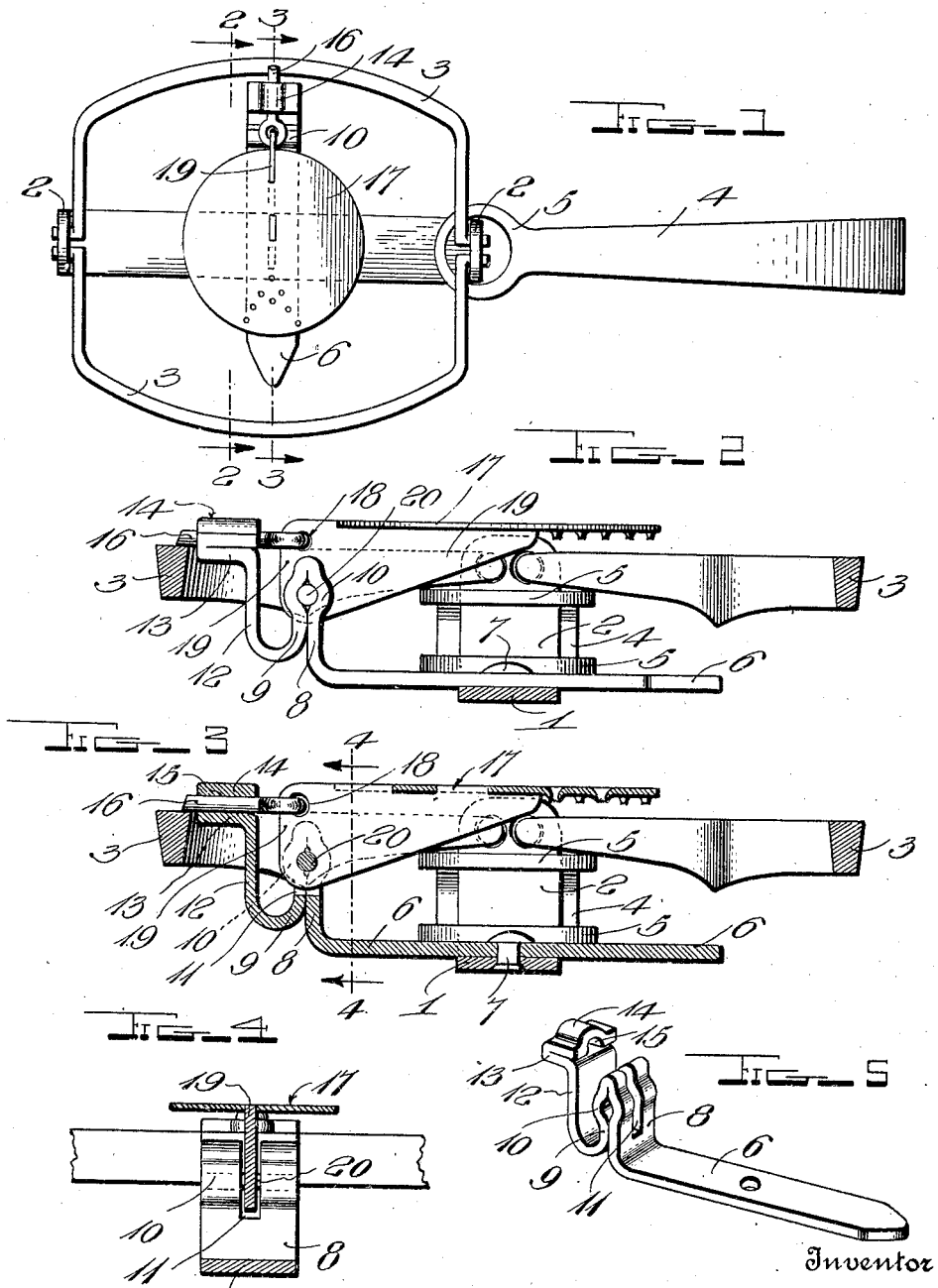

Patented May 26, 1925.

1,539,103

UNITED STATES PATENT OFFICE.

THOMAS H. ALSTON, OF DULCE, NEW MEXICO.

SCENTLESS ANIMAL TRAP.

Application filed March 26, 1923. Serial No. 627,727.

*To all whom it may concern:*

Be it known that I, THOMAS H. ALSTON, a citizen of the United States, residing at Dulce, in the county of Rio Arriba and State of New Mexico, have invented certain new and useful Improvements in Scentless Animal Traps; and I do declare the following to be a full, clear, and exact description of the invention, such as will enable others skilled in the art to which it appertains to make and use the same.

My invention relates to improvements in animal traps, such as those used for trapping wolves and coyotes. These animals and others have become so educated to the scent of traps, especially used or old traps, that it is practically impossible to trap them. It is therefore the principal object of my invention to provide a scentless trap or a trap which will not carry scent and in obtaining this end, I prefer to use iron or steel in the construction of the trap and to coat the entire trap with a scentless plating, or plating which will not carry scent, nickel-plating being preferred.

Another drawback with traps of the ordinary type, is that they may be easily sprung by extremely small animals and birds and furthermore, when the trigger is released by an animal which would make a good catch, this trigger often "kicks" his foot from the trap so that he is not caught between the jaws. It is a further object of my invention to provide a trap which will overcome these difficulties.

With the foregoing in view, the invention resides in the novel subject matter hereinafter described and claimed, the description being supplemented by the accompanying drawing.

Figure 1 is a top plan view of a trap constructed in accordance with my invention.

Figures 2 and 3 are vertical sectional views as indicated by the lines 2—2 and 3—3 of Fig. 1.

Figure 4 is a vertical transverse sectional view on line 4—4 of Fig. 3.

Figure 5 is a perspective view of the bar upon which a sliding jaw-holding pin and a releasing trigger therefor are mounted.

In the drawing above briefly described, the numeral 1 designates the usual base bar of a trap, having upturned ends 2, to which the usual jaws 3 are pivoted to be actuated by the well known spring 4 whose eyes 5 slide upon one of said upturned ends.

A second horizontal bar 6 extends across the base bar 1 and is secured to the intermediate portion of the latter by a rivet or the like 7. At a point spaced between the lowered position of one of the jaws 3 and the base bar 1, the bar 6 is bent upwardly at 8 and is downwardly folded upon itself as indicated at 9 to provide a two-ply upstanding arm. The two plies of this arm are bowed outwardly away from each other adjacent their upper ends to form an eye 10, for a purpose to be hereinafter explained and said arm is formed with a vertical slot 11 extending from its upper extremity to a point below the eye 10.

The portion of the bar 6 beyond the arm 8—9, is bent upwardly to provide a second or outer arm 12, whose upper end is bent laterally outward to provide a horizontal pin support 13, being then folded upon this pin support and bent in arched formation to provide a pin guide 14. The bight portion connecting the parts 13 and 14 is of course formed with an opening 15 through which the pin 16 which rests upon the support 13 and is guided by the guide 14, passes slidably. This pin is adapted to engage the upper edge of one of the jaws 3 when the latter is lowered and to thereby hold the trap in a set position.

For releasing the pin 16, an appropriate trigger 17 is provided, said trigger being pivotally connected to said pin as indicated at 18 and having a vertical portion 19 which is received in the slot 11 of the inner arm 8—9. A pivot pin 20 is passed through the trigger portion 19 and is received in the eye 10, thereby pivotally mounting and properly guiding the trigger.

By employing the construction described, the trap cannot be accidentally released by animals smaller than those intended to be caught thereby and furthermore, there is no danger of the trigger kicking an animal's foot from the trap.

To render the entire trap odorless or not susceptible of carrying a scent, it will be understood that it might if desired be constructed of non-corrosive metal having a smooth shiny surface. I prefer however, to use iron or steel in the manufacture of the trap and when this is done, it is coated with nickel plating or with some other adequate non-corrosive metal. By making this provision, the animals cannot locate the trap by the scent thereof and consequently cannot steer clear thereof, as when the ordinary metal construction is used, it being understood that traps of the character described are usually set concealed from view.

While the plating of the trap will prevent rusting, I wish it clearly understood that it is not for this purpose that it is plated, but the plating is done for the sole purpose of preventing the animals from smelling the trap. Furthermore, the smooth shiny plating of nickel or other non-corrosive metal is employed, not for the purpose of luring animals to the trap by the shiny appearance of the trap, but for the purpose of preventing the trap from carrying either the scent of human beings or animals caught in the trap and for rendering it odorless.

Excellent results are obtainable from the details disclosed and these details are therefore preferably followed. However, it is to be understood that within the scope of the invention as claimed, numerous minor changes may be made, such for instance the construction of the trap with two springs.

I claim:

1. A land-animal jaw trap of the type which is usually set concealed from view, constructed entirely of metal, and having a shiny surface composed of non-corrosive metal.

2. A land-animal jaw trap of the type which is usually set concealed from view, constructed entirely of metal, and provided with a nickel-plated surface.

3. A trap comprising a base with upturned ends to which spring actuated jaws are pivoted, a horizontal bar at an angle to and secured to the intermediate portion of said base, said bar having an outer upstanding arm adjacent the lowered position of one jaw and an inner upstanding arm between said outer arm and said base bar, said outer arm having a pin guide, a pin slidable in said guide to engage said one jaw and hold it lowered, and a foot-operated trigger pivoted to said inner arm and connected with said pin for releasing the latter.

4. A trap comprising a base with upturned ends to which spring actuated jaws are pivoted, a horizontal bar at an angle to and secured to the intermediate portion of said base, said bar being bent upwardly adjacent one end and then folded downwardly upon itself to provide a two-ply upstanding arm whose plies are bulged away from each other near the upper end of the arm to form an eye, said arm having a slot from its upper extremity to a point below said eye; the end portion of said bar beyond said arm being bent upwardly to provide an outer upstanding arm whose upper end is formed with a horizontal pin guide adjacent the lowered position of one of said jaws, a pin slidable in said pin guide for holding said jaw in lowered position, a trigger connected to said pin and received in the slot of said first named arm, and a pivot pin for said trigger received in the aforesaid eye of said first named arm.

5. A trap comprising a base with upturned ends to which spring actuated jaws are pivoted, a horizontal bar at an angle to and secured to the intermediate portion of said base, said bar being bent upwardly adjacent one end and then folded downwardly upon itself to provide a two-ply upstanding arm whose plies are bulged away from each other near the upper end of the arm to form an eye, said arm having a slot from its upper extremity to a point below said eye; the end portion of said bar beyond said arm being bent upwardly to provide an outer upstanding arm whose upper end is bent laterally to form a pin support and then folded on itself to form a pin guide, a pin slidable in said guide and resting on said pin support, a trigger connected to said pin and received in the slot of said first named arm, and a pivot pin for said trigger received in the aforesaid eye of said first named arm.

6. A trap comprising a base with upturned ends to which spring actuated jaws are pivoted, a horizontal bar at an angle to and secured to the intermediate portion of said base, one end portion of said bar being bent upwardly to provide an outer upstanding arm whose upper end is bent laterally to form a pin support and then folded on itself to form a pin guide, a pin slidable in said guide and resting on said pin support to hold one of the jaws in lowered position, a trigger connected to said pin, and an inner arm rising from said bar and carrying said trigger.

In testimony whereof I have hereunto affixed my signature.

THOMAS H. ALSTON.